US012417072B2

(12) United States Patent
Mogul et al.

(10) Patent No.: US 12,417,072 B2
(45) Date of Patent: Sep. 16, 2025

(54) AUDIO OUTPUT DEVICE WITH HARDWARE VOLUME CONTROL

(71) Applicant: Apple Inc., Cupertino, CA (US)

(72) Inventors: Hilary K. Mogul, San Francisco, CA (US); Eric J. Day, San Jose, CA (US); Hannes Breitschaedel, Vienna (AT); Juha O. Merimaa, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/667,996

(22) Filed: May 17, 2024

(65) Prior Publication Data

US 2024/0303033 A1 Sep. 12, 2024

Related U.S. Application Data

(62) Division of application No. 17/355,098, filed on Jun. 22, 2021, now Pat. No. 12,008,287.

(51) Int. Cl.
*G06F 3/16* (2006.01)
*H04R 1/10* (2006.01)

(52) U.S. Cl.
CPC ............ *G06F 3/165* (2013.01); *G06F 3/162* (2013.01); *H04R 1/1041* (2013.01); *H04R 1/1008* (2013.01); *H04R 2420/07* (2013.01)

(58) Field of Classification Search
CPC ....... G06F 3/165; G06F 3/162; H04R 1/1041; H04R 1/1008; H04R 2420/07
See application file for complete search history.

(56) References Cited

U.S. PATENT DOCUMENTS

| | | | |
|---|---|---|---|
| 2009/0245538 A1 | 10/2009 | Tomita | |
| 2014/0185829 A1* | 7/2014 | Bongiovi | H03G 7/007 381/103 |
| 2016/0036402 A1* | 2/2016 | Bongiovi | G10L 21/0364 381/107 |
| 2016/0227339 A1* | 8/2016 | Koppens | H03G 9/025 |
| 2019/0158926 A1 | 5/2019 | Kang et al. | |
| 2021/0311693 A1 | 10/2021 | Goto | |

* cited by examiner

*Primary Examiner* — Joseph Saunders, Jr.
(74) *Attorney, Agent, or Firm* — Aikin & Gallant, LLP

(57) ABSTRACT

A method performed by an audio source device that is communicatively coupled with an audio output device, the method includes obtaining an audio signal; receiving a volume adjustment; applying the volume adjustment to the audio signal; applying dynamic range compression on the volume adjusted audio signal; and applying an inverse volume adjustment to the compressed audio signal, where the inverse volume adjusted audio signal is to be transmitted to the audio output device.

20 Claims, 5 Drawing Sheets

AUDIO OUTPUT DEVICE WITH HARDWARE VOLUME CONTROL

RELATED APPLICATION

This application is a divisional of co-pending U.S. patent application Ser. No. 17/355,098, filed Jun. 22, 2021, which is incorporated herein by reference in its entirety.

FIELD

An aspect of the disclosure relates to an audio output device that has a hardware volume control. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is a method performed by an audio source device that is communicatively coupled with an audio output device, such as a headset or a head-worn device that includes at least one speaker driver and a volume control (e.g., a volume knob or button). For example, the audio output device may be a wireless headset that is wirelessly connected to the audio source device. The audio source device obtains an audio signal, which may be an audio mix (e.g., a mix of one or more audio channels), and receives a volume adjustment. For instance, the volume adjustment may be received from the audio output device, and in response to a user-adjustment of a volume control at (or integrated into) the audio output device. The source device processes the audio signal according to the volume adjustment. Specifically, the source device applies the volume adjustment (e.g., a scalar gain) to the audio mix, applies dynamic range compression on the volume adjusted audio mix, and applies an inverse volume adjustment to the compressed audio signal. The inverse volume adjusted audio signal may then be transmitted to the audio output device for driving the speaker driver of the output device.

In one aspect, the dynamic range compression ensures that a volume adjustment at the audio output device will prevent (or reduce) audio distortion (e.g., audio clipping). For instance, the dynamic range compression is determined based on a difference between a signal level of the volume adjusted audio signal and a threshold audio level, such as 0 decibels relative to full scale (dBFS) of the audio output device. The dynamic range compression may result in a signal level of the compressed audio signal not exceeding 0 dBFS. As previously described, the source device applies an inverse volume adjustment to the compressed audio signal, producing the second volume adjusted audio signal that is transmitted to the audio output device. With the received signal, the audio output device may apply the volume adjustment, resulting in a volume adjusted audio signal that does not exceed 0 dBFS, since the signal was previously compressed by the audio source device based on the volume adjustment. Thus, when used to drive a speaker driver of the audio output device, the digital waveform of the audio signal is not clipped by the output device.

In some aspects, the audio source device may obtain two or more audio channels, and perform matrix mixing operations upon the audio channels to produce the audio signal as an audio mix. For example, the channels may be part of a multichannel audio program (e.g., a movie sound track in 5.1 surround sound format), and the matrix mixing operation may include a downmixing operation in which the multi-channel program channels are reduced, such as to a stereophonic recording with two channels. Thus, the audio channel may be one (or both) of the two stereo channels. In another aspect, the channels may include sound output from one or more software programs that are executing on the audio source device. For example, at least one of the audio channels may be associated with a first software program that is being executed by the audio source device and at least another one of the audio channels may be associated with a second software program that is being executed by the audio source device.

Another aspect of the disclosure is a method performed by the audio output device. For instance, the audio output device may drive a speaker driver to output an audio signal that is obtained from the audio source device. The output device may obtain, from a volume control of the audio output device, a user volume adjustment. For instance, the audio output device may include a volume control (e.g., a volume knob or button) that the user physically adjusts to increase or decrease the volume of the audio mix that is being output. The audio output device adjusts the audio signal based on the user volume adjustment, such as by applying a scalar gain associated with the adjustment, and drives the speaker driver to output the adjusted audio signal while the audio output device transmits the user volume adjustment to the audio source device. As described herein, the audio source device may generate a processed audio signal by applying a separate user volume adjustment, dynamic range compression, and inverse of the user volume adjustment to the audio signal. In response to transmitting the user volume adjustment, the audio output device receives, from the audio source device, the processed audio signal. The audio output device adjusts the processed audio signal based on the user volume adjustment (e.g., applying a scalar gain based on the volume adjustment), and drives the speaker driver to output the adjusted processed audio signal.

In one aspect, the audio output device generates, responsive to the user volume adjustment, an audio feedback signal, and drives the speaker driver to output the audio feedback signal. Such a feedback signal may alert the user of the adjusted volume level at the audio output device. In some aspects, the processed audio signal received from the audio source device is in a floating-point audio format, in which case the audio output device converts the adjusted processed audio signal to a fixed-point audio format. In one aspect, a signal level of the adjusted processed audio signal while in the floating-point audio format does not exceed 0 dBFS of the audio output device.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
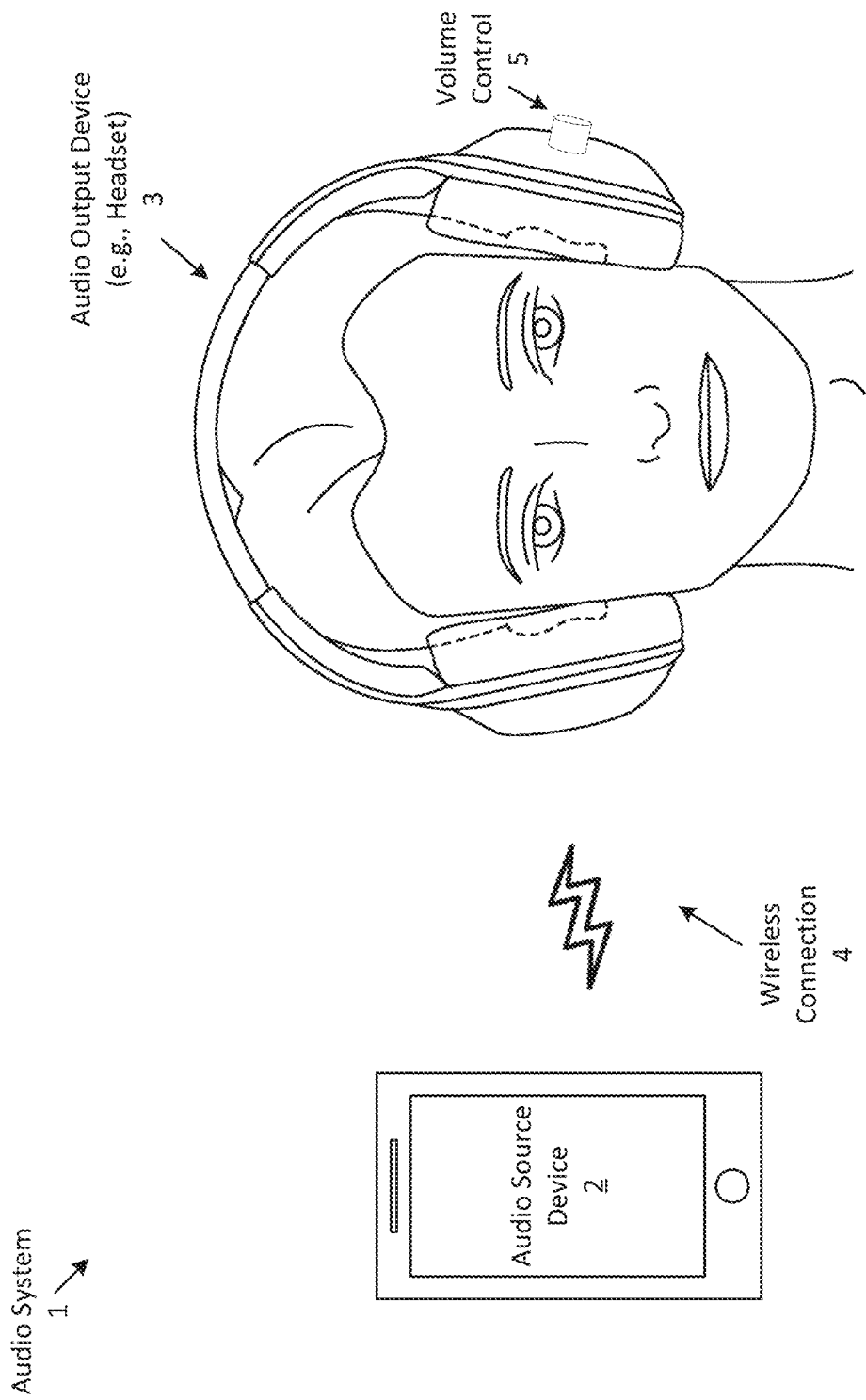
FIG. 1 shows an audio system that includes an audio source device and an audio output device according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Wireless communication capabilities are available in a broad array of accessory devices that can be configured to communicate with an audio source device, such as a multimedia device (e.g., smart phone). For instance, wireless audio output devices, such as a wireless headset or a pair of wireless earphones, can connect via a wireless personal area network (WPAN) connection to the source device in order to stream audio data for playback at the output device. In one aspect, the WPAN connection may be a BLUETOOTH connection using any BLUETOOTH communication protocol. To stream high-quality playback audio data (e.g., music), the audio source device packetizes the playback audio (e.g., partitions the data into units (or frames) for transmission) according to the protocol (e.g., Advanced Audio Distribution Profile (A2DP) protocol), and transmits the packets over an over-the-air (or wireless) radio frequency (RF) signal to the wireless audio output device. The received packets are stored in a long buffer in the output device in order to provide continuous audio playback in situations when future packets are dropped (e.g., due to transmission interference). The playback audio data in the buffer are de-packetized and processed for audio output through one or more speakers. This process is repeated while audio output is desired at the audio output device.

Although convenient, streaming audio data between two devices has latency drawbacks. For instance, streaming audio data through BLUETOOTH may require tens of milliseconds for audio processing to generate an encoded audio packet and up to a few hundred milliseconds of buffering, resulting in over 250 milliseconds of end-to-end latency. In addition, any error-correction schemes (e.g., forward error correction (FEC) code) that are used to detect errors in packets may add additional latency. This end-to-end latency may not be noticeable at the start of playback, since the audio output device may delay playback to fill its buffer. Due to this latency, however, user adjustments of the audio stream during playback may be noticeable and interfere with the user's listening experience. In particular, if a user were to adjust the volume during playback, the adjustment may be delayed. For example, when the user performs a "software" volume adjustment in a software application (e.g., a media player software application) that is being executed by the source device and is streaming the audio data, the audio data may be adjusted (e.g., by applying a scalar gain) and transmitted to the audio output device. The output device will have to exhaust the long buffer of the audio data that was received from before the volume adjustment. As a result of this delay, the user experience may be adversely effected due to the user's late perception of the volume adjustment being applied to the audio stream with respect to when the user actually performs the adjustment.

This latency problem may be further compounded when volume adjustments are performed at the audio output device. For instance, some audio output devices may include a "hardware" volume control that may be a dedicated volume input control (e.g., volume knob or button) that allows a user to adjust the volume at the audio output device. In this case, when the user manipulates the control, the audio output device may transmit a control signal (e.g., over BLUETOOTH) to the audio source device that indicates a user volume adjustment. As a result, such a scheme may add significantly to the overall latency due to the additional communication between the two devices.

In one aspect, a volume adjustment of the volume control may be (immediately) applied by the audio output device in order to reduce the delay. This additional audio processing at the audio output device, however, may inadvertently distort (e.g., audio clip) an audio waveform of the audio data being output by the output device. This may be due to the types of digital audio signal processing that is performed in both devices. The audio source device may be configured to perform floating-point digital audio signal processing in which the audio data is in a floating-point audio format. For example, the audio data may be pulse-code modulation (PCM) digital audio that represents the audio as a series of multi-bit samples, where each sample may have a sample depth (or word length) of several bits (e.g., 8, 16, 20, 24, 32-bit, etc.) at any sampling frequency, such as 44.1 or 48 kHz. In another aspect, the audio data may be in any audio file format, such as advanced audio coding (AAC), etc. In contrast, however, the audio output device may be configured to perform fixed-point digital audio signal processing upon an audio stream, due to having a fixed-point processor, for example. As a result, the dynamic range of digital audio processed by and received from the audio source device may be drastically reduced when processed at the output device. For instance, a 32-bit audio sample as a floating-point number has a dynamic range of more than 1,500 dB, whereas a 32-bit sample as a fixed-point number has a dynamic range of about 192 dB. As a result, the dynamic range of a digital audio signal in floating-point audio format may exceed 0 decibels relative to full scale (dBFS), while digital audio in fixed-point audio format remains within the digital range (not exceeding 0 dBFS). Thus, audio data received from the audio source in floating-point audio format that exceeds the digital range may be cut off or clipped when converted and processed in fixed-point audio format by the audio output device.

To overcome these deficiencies in latency and audio signal processing, the present disclosure describes an audio system that is capable of applying a user-volume adjustment at an audio output device, while in addition preventing distortion of the audio data. Specifically, the audio system includes an audio source device that is communicatively coupled with an audio output device such that the output device receives digital audio data in floating-point audio format from the source device for driving one or more speaker drivers. In particular, the audio output device may receive an audio signal of playback audio (e.g., music) from the audio source device for playback. While playing back the music, the audio output device may receive a volume adjustment from a volume control of the audio output device. In response, the audio output device may adjust the digital audio data based on the volume adjustment (e.g., applying a scalar gain according to the adjustment). Once adjusted, the audio output device may convert the signal into fixed-point audio format and may drive the one or more speaker drivers using the converted audio signal.

In addition, the audio output device may transmit the volume adjustment to the audio source device to process the audio signal downstream. In particular, the source device obtains (e.g., a later portion of) the audio signal to be transmitted to the audio output device, which may be in a floating-point audio format having a signal level that exceeds the 0 dBFS. The source device receives, from the audio output device, the volume adjustment, and produces a first volume adjusted audio signal by applying the volume adjustment to the audio signal. Thus, the volume adjusted audio signal may have a signal level that is representative of the volume adjustment at the audio output device. The source device produces a compressed audio signal by applying dynamic range compression upon the first volume adjusted audio signal based on the volume adjustment. In one aspect, this compression may adjust the dynamic range of the signal, such that it is below an audio threshold level, such as 0 dBFS. The source device produces a second volume adjusted audio signal by applying an inverse volume adjustment to the compressed audio signal, and the second volume adjusted audio signal is transmitted to the audio output device. After receiving the processed audio signal, the audio output device may apply the original volume adjustment, and use the signal (e.g., once converted into fixed-point audio format) to drive the speaker driver. Since this signal was compressed at the audio source device, this ensures that the volume adjustment performed by the audio output device does not exceed 0 dBFS. Thus, the present disclosure provides an audio system in which a volume adjustment may be immediately applied to an audio stream at an audio output device, while contemporaneously processing the audio signal to ensure that the processed signal does not exceed the audio output device's output capabilities.

FIG. 1 shows an audio system 1 that includes an audio source device 2 and an audio output device 3 according to one aspect. In one aspect, the audio system may include other devices, such as a remote electronic server (not shown) that may be communicatively coupled to either the audio source device, the audio output device, or both, and may be configured to perform one or more operations as described herein. As illustrated, the audio output device is a headset (e.g., over-the-ear headphones) that at least partially covers the user's ears and is arranged to direct sound into the ears of the wearer. The headset includes a left earphone (or earcup) for the user's left ear and a right earphone (or earcup) for the user's right ear. In this case, each earphone may be configured to output at least one audio channel of a program audio (e.g., the right earphone outputting a right audio channel and the left earphone outputting a left audio channel of a two-channel input of a stereophonic recording, such as a musical work). As shown, the headset includes a volume control 5 that is a physical control (e.g., knob, button, etc.) that is for receiving user-volume adjustments (e.g., of program audio that is being output by the headset). More about this control is described herein. In another aspect, the audio output device may be any other two of headset, such as one or more earphones (or in-ear headphones or earbuds) that are positioned on (or in) the user's ears. In some aspects, the earphone may be a sealing type that has a flexible ear tip that serves to acoustically seal off the entrance of the user's ear canal from an ambient environment by blocking or occluding in the ear canal. In some aspects, the headset may be on-ear headphones. In another aspect, the output device may be any electronic device that includes at least one speaker and is arranged to be worn by the user and arranged to output sound by driving the speaker with an audio signal.

In some aspects, the audio output device may be a head-worn device, as illustrated herein. In another aspect, the audio output device may be any electronic device that is arranged to output sound into an ambient environment. Examples may include a stand-alone speaker, a smart speaker, a home theater system, or an infotainment system that is integrated within a vehicle.

The audio source device 2 is illustrated as a multimedia device, more specifically a smart phone. In one aspect, the audio source device may be any electronic device that can perform audio signal processing operations and/or networking operations. An example of such a device may include a tablet computer, a laptop, a desktop computer, a smart speaker, etc. In one aspect, the source device may be a portable device, such as a smart phone as illustrated in this figure. In another aspect, the source device may be a head-mounted device, such as smart glasses, or a wearable device, such as a smart watch.

As shown, the audio source device 2 is communicatively coupled to the audio output device 3, via a wireless connection 4. For instance, the source device may be configured to establish the wireless connection with the audio output device 3 via a wireless communication protocol (e.g., BLUETOOTH protocol or any other wireless communication protocol). During the established wireless connection, the audio source device may exchange (e.g., transmit and receive) data packets (e.g., Internet Protocol (IP) packets) with the audio output device, which may include audio digital data in any audio format (e.g., Advanced Audio Distribution Profile (A2DP) audio).

In another aspect, the audio source device 2 may communicatively couple with the audio output device 3 via other methods. For example, both devices may couple via a wired connection. In this case, one end of the wired connection may be (e.g., fixedly) connected to the audio output device, while another end may have a connector, such as a media jack or a universal serial bus (USB) connector, which plugs into a socket of the audio source device. Once connected, the audio source device may be configured to drive one or more speakers of the audio output device with one or more audio signals, via the wired connection. For instance, the audio source device may transmit the audio signals as digital audio (e.g., PCM digital audio). In another aspect, the audio may be transmitted in analog format.

In some aspects, the audio source device 2 and the audio output device 3 may be distinct (separate) electronic devices, as shown herein. In another aspect, the audio source device may be a part of (or integrated with) the audio output device. For example, as described herein, at least some of the components of the audio source device (such as a controller) may be part of the audio output device, and/or at least some of the components of the audio output device may be part of the audio source device. In this case, each of the devices may be communicatively coupled via traces that are a part of one or more printed circuit boards (PCBs) within the audio output device.

Figure 2:
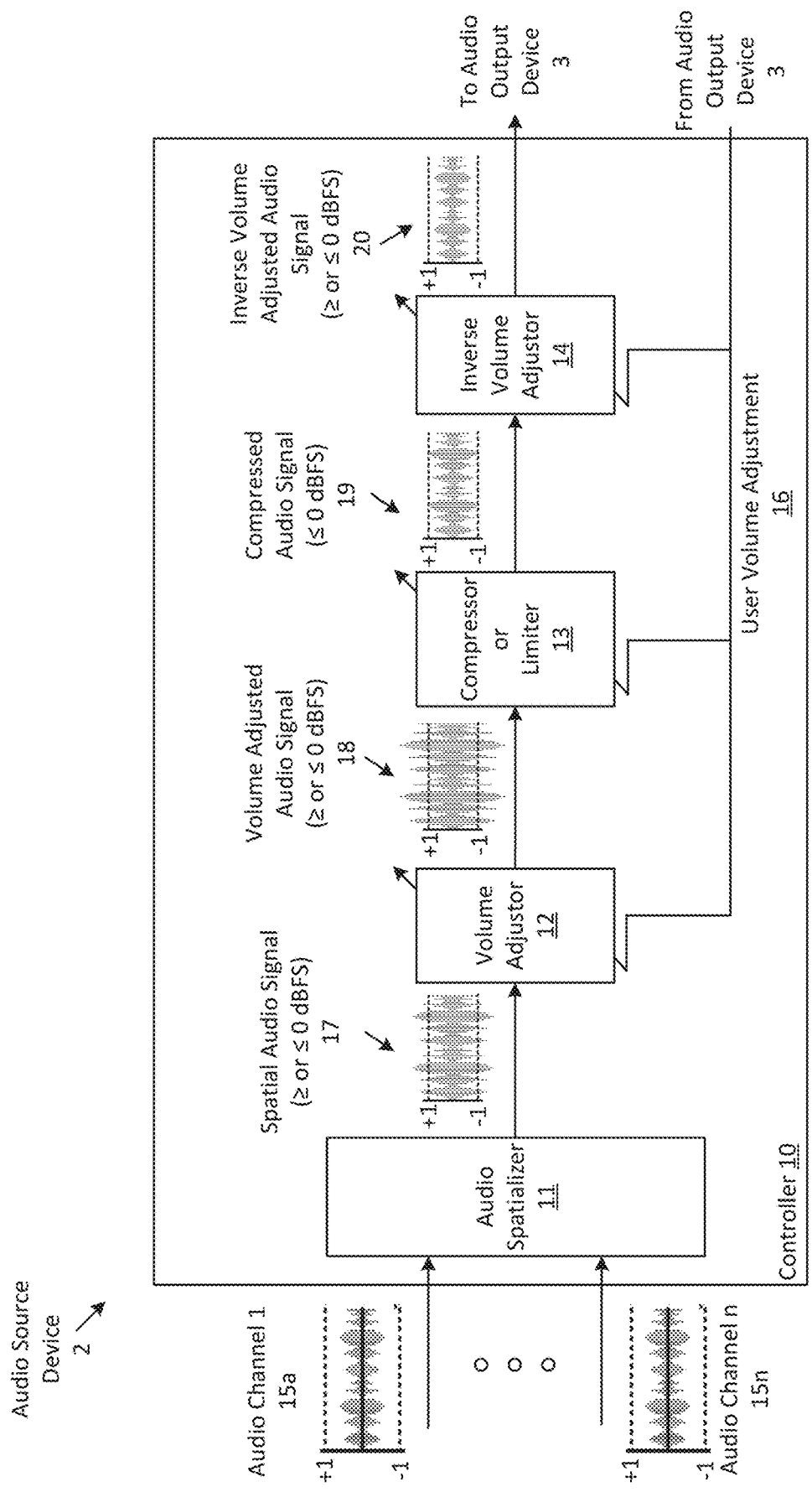
FIG. 2 shows a block diagram of the audio source device of the audio system that performs dynamic range compression based on a hardware volume adjustment at the audio output device according to one aspect.

FIG. 2 shows a block diagram of the audio source device 2 of the audio system 1 that performs dynamic range compression based on a volume adjustment at the audio output device 3 according to one aspect. Specifically, the audio source device includes a controller 10 that may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one aspect, the controller is configured to perform one or more audio signal processing operations and/or networking operations. In one aspect, operations performed by the controller may be implemented in software (e.g., as instructions stored in memory of the audio source device (and/or memory of the controller)) and executed by the controller and/or may be implemented by hardware logic structures. In one aspect, the audio source device may include more elements, such as at least one speaker driver for outputting audio and at least one display screen for displaying image data.

In one aspect, the controller 10 may be designed to perform floating-point audio signal processing operations upon (e.g., one or more audio signals as) digital audio data. Specifically, the controller may be specially designed to execute floating-point operations upon (e.g., the PCM) digital audio (e.g., 32-bit audio) in which samples of the digital audio are in floating-point audio format. In addition to, or in lieu of, being designed to perform floating-point audio signal processing operations, the controller may be designed to perform fixed-point audio signal processing operations upon digital data that is in a fixed-point audio format.

As shown, the controller may have one or more operational blocks, which include an audio spatializer 11, a volume adjustor (or adjuster) 12, a compressor or limiter 13, and an inverse volume adjustor 14. In one aspect, each of the operational blocks perform one or more audio signal processing operations in which digital audio data is processed while being in a floating-point format (e.g., audio samples being represented as floating-point numbers), as described herein. Thus, the digital audio data received by and produced by at least some of the operational blocks may be in floating-point format.

The audio spatializer is configured to obtain one or more audio channels (or audio signals) 15a-15n, and perform audio signal processing operations. In one aspect, the audio channels may be obtained from local memory and/or may be obtained from a remote memory device (e.g., from a remote server with which the audio source device is communicatively coupled via the Internet). In one aspect, at least some of the audio channels may include audio data of a piece of program audio. For example, the channels may be left and right channels of a stereophonic recording of a musical composition, or the channels may be two or more channels, such as for example the entire audio soundtrack in 5.1-surround format of a motion picture film or movie. In another aspect, at least some of the channels may include one or more sound objects of a sound space (e.g., the channels may be in a Higher Order Ambisonics (HOA) format). In one aspect, the audio channels may include sounds in any format.

In one aspect, each of the audio channels 15a-15n may be obtained from a software program that is executing on the audio source device. For instance, a music streaming software program may be streaming a musical composition from over the Internet as the one or more channels 15a-15n (e.g., two stereophonic channels). In another aspect, at least some of the audio channels may be obtained from different software programs executing on the audio source device. For example, at least one channel may be associated with (e.g., and obtained from) a first software program, such as the music streaming program, and at least another channel may be associated with a second software program that is being executed by the audio source device, such as an audible ringing alert that is obtained from a telephony software program in response to the audio source device receiving a telephone call.

In one aspect, each of the audio channels may be digital audio in a floating-point audio format, as described herein. As shown, each of the audio channels is associated with a signal graph that illustrates a signal level of the channel in a digital domain. Specifically, each of the graphs illustrates the digital range from a positive threshold value ("+1") to a corresponding negative threshold value ("−1"). In one aspect, each of the threshold values represents a largest (and corresponding smallest) integer value of the audio data in fixed-point audio format, whereby the range between the values represents the dynamic range of the fixed-point audio format. In one aspect, the threshold values may represent 0 dBFS of the audio system (or more specifically the audio output device), above which portions of the digital waveform may be clipped if used to drive one or more speaker drivers. In another aspect, the threshold values may represent a sound pressure level (dB SPL) that is below 0 dBFS. As illustrated, the digital waveforms of each of the audio channels 15a-15n include audio data in the floating-point audio format that do not exceed the digital range of the audio system, and therefore would not clip if used to drive one or more speaker drivers of the audio output device. In one aspect, a signal level of at least one of the audio channels may exceed the range (e.g., having a digital waveform that exceeds +1 and/or −1).

In one aspect, the audio spatializer 11 is configured to spatial render the one or more audio channels 15a-15n to produce a spatial audio signal 17. In particular, the spatializer may apply one or more spatial filters according to spatial characteristics (e.g., elevation, azimuth, distance, etc.), such that which when outputted through one or more speaker drivers a 3D sound is produced (e.g., giving the user the perception that sounds are being emitted from a particular location within an acoustic space). For example, the spatializer may perform binaural rendering in which the controller applies spatial audio filters (e.g., head-related transfer functions (HRTFs)) to one or more audio channels to produce at least one binaural signal (e.g., a left audio signal and/or a right audio signal) as the spatial audio signal. In some aspects, the HRTFs may be personalized for the user of the audio system in order to account for the user's anthropometrics. In another aspect, the spatial filters may be default filters. As a result of the spatial rendering, the spatializer produces the spatial audio signal 17 that includes a digital waveform that exceeds (or may exceed) the digital range (e.g., as illustrated by the digital waveform crossing +1 and −1). In some aspects, the spatializer may be configured to perform any floating point audio signal processing operation that results in absolute values (e.g., digital waveform values) higher than 1.0 f. Alternatively, however, the spatial audio signal may be less than the positive and negative thresholds (e.g., its waveform may be contained within the digital range).

In another aspect, in addition to or in lieu of spatial rendering the audio channels the spatializer is configured to perform matrix mixing operations upon the spatial rendered audio channels to produce an audio mix as the spatial audio signal. For example, the spatializer may apply one or more spatial filters upon the channels, and then combine one or more of the rendered channels together. As described herein, the spatializer may perform the matrix mixing operations instead of performing spatial rendering operations. For example, when the audio channels are a part of a multichannel audio program (e.g., in 5.1 surround sound format, the spatializer may perform downmixing operations to produce one or more audio signals (e.g., as two stereophonic channels) for output by the audio system. In another aspect, the spatializer may perform spatial rendering operations after one or more audio channels are mixed.

The controller 10 is configured to receive a user volume adjustment (or volume adjustment) 16 from the audio output device 3 (e.g., over the wireless connection 4). In one aspect, the user volume adjustment may be a control signal that indicates a user volume adjustment of the volume control 5 of the audio output device (e.g., the user turning the volume control to increase or decrease the volume at the audio output device 3). In one aspect, the adjustment 16 may indicate a change of the current volume (e.g., a percentage value) and/or indicate a current state of the volume (e.g., gain value) after the user adjustment is performed. In one aspect, the control signal may be received in response to an adjustment of the volume control. In another aspect, the control signal may be received periodically (e.g., every minute, hour, etc.).

The volume adjustor 12 is configured to receive the user volume adjustment 16 and the spatial audio signal 17, and is configured to produce a (e.g., first) volume adjusted audio signal 18 by applying the volume adjustment 16 to the spatial audio signal 17. In particular, the volume adjustor 12 is configured to adjust (e.g., at least a portion of) the signal level (e.g., by applying a scalar gain value associated with the volume adjustment 16) to the spatial audio signal 17. In this example, the user volume adjustment 16 increased the volume, which is illustrated by the adjusted audio signal 18 having a larger signal level (e.g., taller peaks) than the (peaks of) audio signal 17. In one aspect, the adjusted audio signal 18 may have a signal level that is equal or greater than (or less than) one or more threshold values, as described herein.

The compressor or limiter (compressor) 13 is configured to determine whether to perform compressor (or limiter) operations upon the volume adjusted audio signal 18 based on the user volume adjustment 16. Specifically, the compressor determines whether to adjust a dynamic range of the audio signal based on a difference between a signal level of the first volume adjusted audio signal and a threshold audio level. In one aspect, the threshold audio level may be the threshold values +1/−1 (e.g., 0 dBFS of the audio output device). In one aspect, the determination may be based on whether spectral content of one or more frequencies of the volume adjusted audio signal exceed the threshold. In one embodiment, if at least a portion of the audio signal is above (or exceeds) the threshold audio level, the compressor may apply dynamic range compression upon the (portion of the) audio signal to produce a compressed audio signal 19 that includes a digital waveform that remains within the digital range, as illustrated. Thus, the compressed audio signal has a signal level that does not exceed the threshold audio level.

In some aspects, the compressor or limiter 13 may be configured to determine whether to perform compression operations based on the user volume adjustment. For instance, the compressor may use the user volume adjustment to compare a current volume level with a previous volume level of the system. If the current volume level exceeds the previous volume level by a threshold, the compressor may apply dynamic range compression.

In one aspect, compressor or limiter 13 operations may be performed based on the extent to which (a portion of) the signal level of the audio signal exceeds the threshold values. In one aspect, a limiter is configured to limit a maximum level (e.g., at or below the audio threshold level), thereby having a high compression ratio (e.g., 10:1). A compressor, on the other hand, provides less dramatic compression, having a lower compression ratio than the limiter (e.g., having a ratio of 5:1 or less). In one aspect, the compressor or limiter operations may be selected based on whether at least a portion of a signal level exceeds the audio threshold level by a threshold range. For example, if the signal level (e.g., of certain spectral content of the signal) is above the threshold range, limiter operations may be applied to the signal, whereas if the signal level is within the threshold range compressor operations may be applied to the signal. In some aspects, different operations may be applied to different portions of the audio signal such that an overall signal level of the compressed audio signal remains within the digital range.

The inverse volume adjustor 14 is configured to receive the user volume adjustment 16 and the compressed audio signal 19, and is configured to produce an inverse (e.g., second) volume adjusted audio signal 20 by applying an inverse volume adjustment of the volume adjustment 16 to the compressed signal 19. In one aspect, the volume adjustor 14 is configured to adjust (e.g., at least a portion of) the signal level by applying a scalar gain value that is inverse (or opposite) to the scalar gain value applied by the adjustor 12. Specifically, the adjustor 14 may apply a (second) gain value that removes the increase (or decrease) of the signal level that is attributed to the gain value previously applied by the volume adjustor 12. As shown, the audio signal 20 produced by adjustor 14 has a waveform that is within the digital range. In another aspect, the audio signal 20 may exceed that range.

Once the audio signal 20 is produced, the audio source device 2 is transmits the audio signal to the audio output device 3. For example, the source device may wirelessly transmit (e.g., via a wireless connection 4) the audio signal to the audio output device. As another example, the source device may transmit the audio signal via a wired connection with the audio output device.

Figure 3:
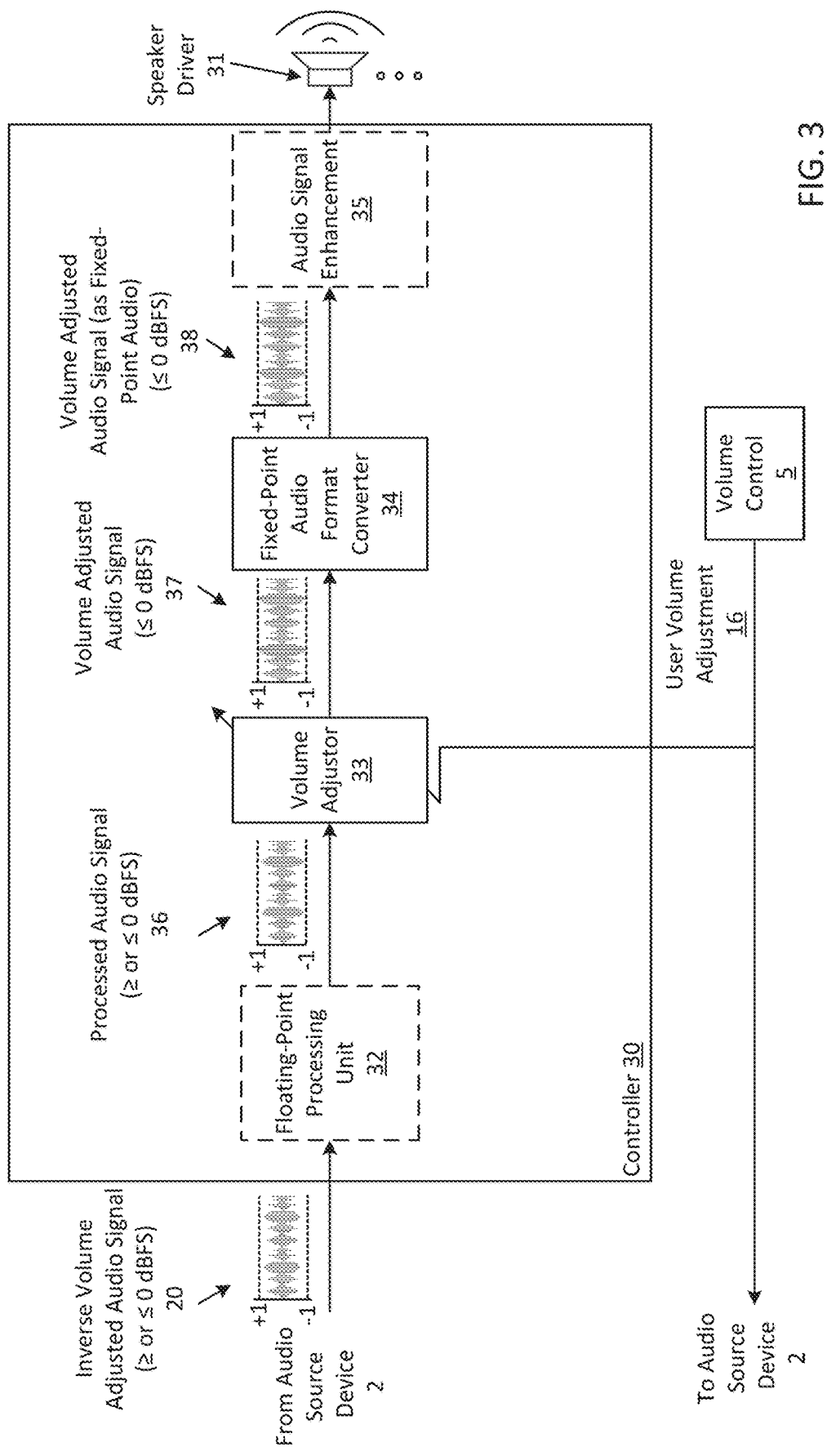
FIG. 3 shows a block diagram of the audio output device that performs the hardware volume adjustment according to one aspect.

FIG. 3 shows a block diagram of the audio output device 3 that performs the hardware volume adjustment according to one aspect. The audio output device 3 includes a controller 30, the volume control 5, and one or more speaker drivers 31. In one aspect, the audio output device may include more or less elements, such as including one or more microphones that are arranged to capture sound (e.g., from the ambient environment), and produce one or more microphone signals. In one embodiment, each of the speaker drivers that may be an electrodynamic driver that may be specifically designed for sound output at certain frequency bands, such as a woofer, tweeter, or midrange driver, for example. In one aspect, each speaker driver may be a "full-range" (or "full-band") electrodynamic driver that reproduces as much of an audible frequency range as possible. Each speaker "outputs" or "plays back" audio by converting an analog or digital speaker driver signal into sound. In another aspect, the audio output device may include "extra-aural" speaker drivers that may be integrated into a housing of the audio output device and arranged to project (or output) sound directly into the physical setting. This is in contrast to speaker drivers of headphones (e.g., earphones or earbuds) that are arranged to produce sound towards (or directly into) a respective ear of a user. In one aspect, these extra-aural speakers may form a speaker array that is configured to produce spatially selective sound output. For example, the array may produce directional beam patterns of sound that are directed towards locations within the environment, such as the ears of the user. In this case, the controller 30 may be configured to perform beamforming operations in which the controller produces driver signals from one or more input audio signals, which when used to drive the speaker drivers 31 create the directional beam patterns that include at least a portion audio content of the input audio signals.

As described herein, the volume control 5 is configured to produce a user volume adjustment 16 (e.g., as a control signal) in response to user input. Specifically, the control may be a hardware volume control that is a dedicated volume input control for allowing a user to adjust the volume at the audio output device. For instance, the controller 30 is configured to receive the control signal from the volume control 5 (e.g., in response to user input), and is configured to apply the user volume adjustment upon an audio signal for driving the one or more speaker drivers 31. In one aspect, the volume control may be any input device, such as a physical volume control (e.g., knob, a set of buttons, etc.) that is configured to produce the user volume adjustment in response to receiving input from a user (e.g., twisting the volume knob). For instance, the adjustment may be based on an amount of rotational movement of the knob.

As illustrated, the audio output device 3 is configured to transmit the user volume adjustment 16 (e.g., in response to user input) to the audio source device 2, as described herein. The audio output device 3 is configured to receive the inverse volume adjusted audio signal 20 produced by the inverse volume adjustor 14. As described herein, the audio signal received by the audio output device may be in a floating-point audio format.

The controller 30 may be designed to perform floating-point audio signal processing operations and/or fixed-point audio signal processing operations. As shown, the controller may have one or more operational blocks, which include a floating-point processing unit 32, a volume adjustor 33, a fixed-point audio format converter 34, and an audio signal enhancement 35. The floating-point processing unit 32 is configured to perform one or more audio signal processing operations upon the audio signal 20 and produce a processed audio signal 36, which may have a signal level that exceeds the audio threshold level or be contained within the digital range. For example, the processing unit may be configured to perform an active noise cancellation (ANC) function to cause the speaker 31 to produce anti-noise (e.g., by adding the anti-noise to the received signal) in order to reduce ambient noise from the environment that is leaking into the user's ears. The ANC function may be implemented as one of a feedforward ANC, a feedback ANC, or a combination thereof. As a result, the processing unit may receive a reference microphone signal from a microphone (not shown) that captures external ambient sound. In another aspect, the controller may perform any ANC method to produce the anti-noise. In another aspect, the processing unit may perform a transparency function in which sound played back by the audio output device 3 is a reproduction of the ambient sound that is captured by the device's external microphone in a "transparent" manner, e.g., as if the headset was not being worn by the user. The processing unit processes at least one microphone signal captured by at least one external microphone and filters the signal through a transparency filter, which may reduce acoustic occlusion due the audio output device being on, in, or over the user's ear, while also preserving the spatial filtering effect of the wear's anatomical features (e.g., head, pinna, shoulder, etc.). The filter also helps preserve the timbre and spatial cues associated with the actual ambient sound. In one aspect, the filter of the transparency function may be user specific according to specific measurements of the user's head. For instance, the processing unit may determine the transparency filter according to a head-related transfer function (HRTF) or, equivalently, head-related impulse response (HRIR) that is based on the user's anthropometrics. In one aspect, the floating-point processing unit may convert the audio signal 20 into a different audio format. For example, the processing unit may decompress the audio signal, which may have been compressed using any codec, when the audio was transmitted over a wireless connection.

The volume adjustor 33 is configured to receive the processed audio signal and the user volume adjustment 16, and is configured to produce a (third) volume adjusted audio signal 37 by applying the volume adjustment to the processed audio signal. Thus, the adjustor 33 performs similar operations as the adjustor 12 of the audio source device. In one aspect, the volume adjusted audio signal has a digital waveform that has a signal level that is below the audio threshold level (e.g., 0 dBFS), as illustrated herein. The fixed-point audio format converter 34 is configured to receive the audio signal 37 and to convert the signal from floating-point audio format to a volume adjusted audio mix 38 in a fixed-point audio format. As shown, the audio signal 38 has a digital waveform that is within the digital range, and therefore will not be clipped when used to drive the speaker driver 31. In one aspect, the converter 34 may perform these operations using any known method to convert the audio signal from one format to another. In another aspect, the fixed-point audio format may be any known format and the audio signal 38 may have the same or different bit depth and/or frequency as the audio signal 37.

The audio signal enhancement 35 is configured to receive the audio signal 38 and perform one or more fixed-point audio signal processing operations to produce one or more driver signals for driving the one or more speaker drivers 31. For example, the enhancement 35 may be configured to perform ANC operations to reduce (or eliminate) noise (e.g., in lieu of or in addition to the ANC operations performed by the processing unit 32). In another aspect, the audio signal enhancement 35 may apply equalization operations upon (e.g., spectrally shape) the signal. In some aspects, the enhancement may apply one or more scalar gains upon the signal. In another aspect, the enhancement may perform other operations, such as beamforming operations, as described herein. In one aspect, the audio signal enhancement 35 is configured to generate an audio feedback signal, responsive to the user volume adjustment 16, and drive the speaker driver to output the signal. In particular, the feedback signal may include a sound (e.g., a "ding" sound) that indicate the adjusted volume level. In some aspects, the enhancement may mix the feedback signal with the audio signal 38 received from the converter 34 to produce a combined audio signal for output.

In one aspect, the audio signal received by the audio output device may remain within the digital range throughout the audio signal processing operations performed by the controller 30. Specifically, signals 36-38 may remain within the digital range. In another aspect, signal 36 may exceed the digital range, while signals 37 and 38 remain within the range, as shown.

In one aspect, at least some of the operational blocks (e.g., blocks with dashed borders) described herein are optional and may or may not be performed. For example, the floating-point processing unit 32 may be optional and/or the audio signal enhancement 35 may be optional. In which case, the controller 30 may not perform operations if those blocks were omitted. As illustrated in FIGS. 2 and 3 certain operational blocks may be performed by controllers 10 and 30 of the audio source device 2 and the audio output device 3, respectfully. In one aspect, either controller may include any of the operational blocks illustrated herein, such that either device may perform some or all of the audio signal processing operations. For example, the controller 30 of the audio output device 3 may include blocks 11-14, such that one or more audio channels are spatialized, volume adjusted, and compressed by the audio output device.

As described herein, the audio system 1 includes the audio source device 2 and the audio output device 3 are performing operations to perform dynamic range compression of an audio signal performing a hardware volume adjustment of the processed signal at the audio output device. In one aspect, the audio system may perform the operations for one or more audio signals, each of which may be a same (or different) audio mix. As described herein, the audio spatializer 11 may spatial render one or more audio channels to produce binaural audio signals. In one aspect, the audio source device and the audio output device may perform at least some of the operations upon both audio signals, which are to be used by the audio output device to drive at least two speaker drivers (e.g., a left speaker driver and a right speaker driver).

In one aspect, in addition to (or in lieu of) receiving the user volume adjustment 16 from the audio output device 3 (e.g., in response to user input at the volume control 5), the audio source device may receive the volume adjustment from user input at the audio source device. For example, the audio source device may include a volume control, which may be a physical device (such as a volume knob, as shown in FIG. 1), or the control may be a user interface (UI) button contained within a graphical user interface (GUI) displayed on a display screen of the source device. In which case, the audio source device 2 may transmit the user volume adjustment 16 to the audio output device, which when received adjusts the volume adjustor 33, as described herein. As a result, the volume adjustment may be applied at the audio output device, as described herein.

Figure 4:
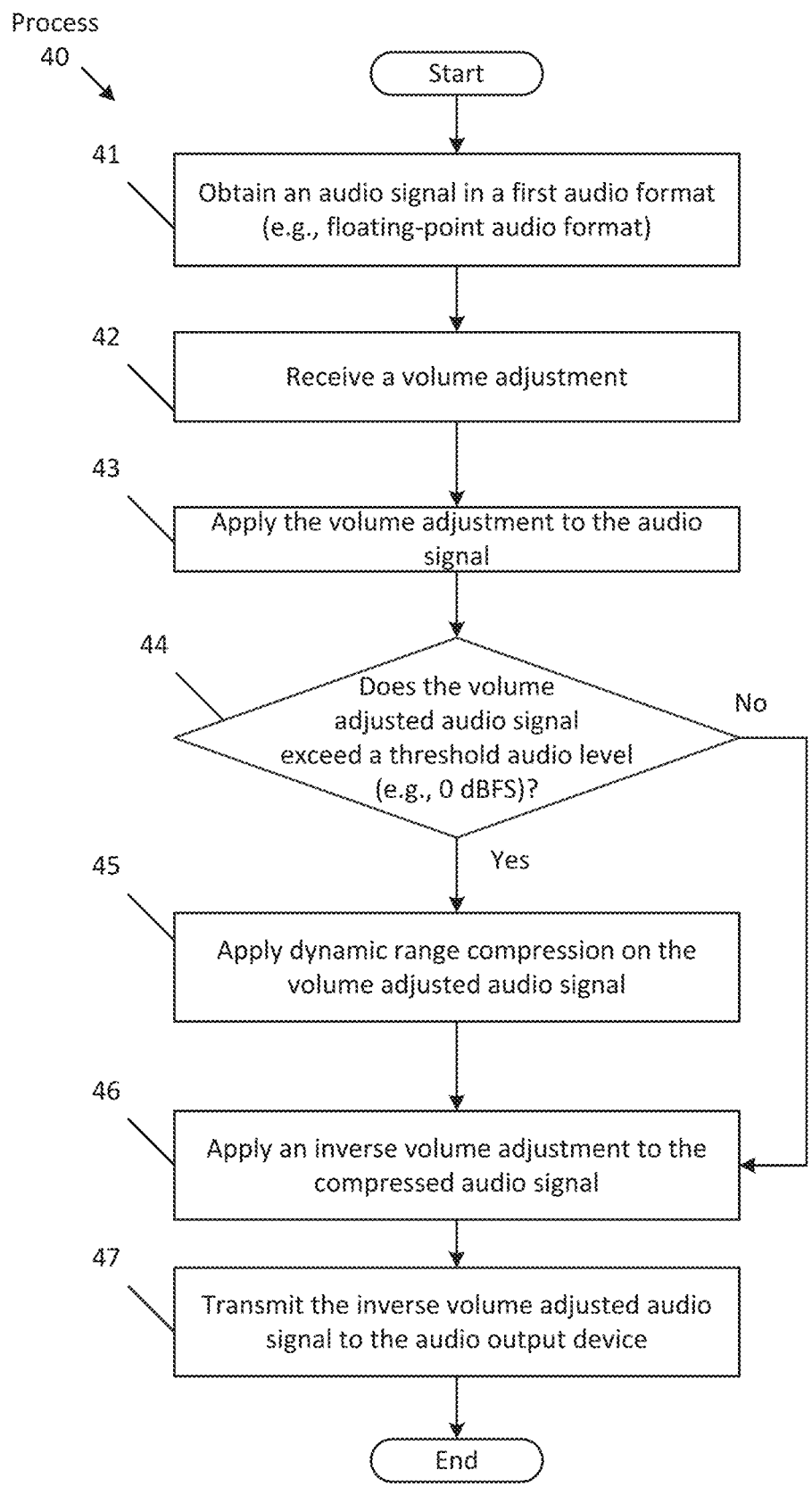
FIG. 4 is a flowchart of one aspect of a process for processing audio in response to a hardware volume adjustment at the audio output device according to one aspect.

FIG. 4 is a flowchart of one aspect of a process 40 for processing audio in response to a hardware volume adjustment at the audio output device according to one aspect. In one aspect, the process 40 is performed by the controller 10 of the audio source device 2. Specifically, at least some of the operations may be performed by at least some of the operational blocks 11-14 performed by the controller 10, as described herein.

The process 40 begins by the controller 10 obtaining an audio signal in a first audio format, such as floating-point audio format (at block 41). For example, the audio signal may be an audio mix of one or more audio channels 15a-15n. In another aspect, the audio signal may be a spatial audio signal produced by the audio spatializer when applying one or more spatial filters upon one or more of the audio channels, as described herein. In one aspect, once the audio channels are spatialized, the spatializer may perform matrix mixing operations to mix the spatialized channels into one or more audio mixes. The controller 10 receives a volume adjustment (at block 42). As described herein, the volume adjustment may be received from the audio output device 3 (e.g., in response to user input at the volume control 5). As another example, however, the volume adjustment may be received at the audio source device (e.g., in response to user input that is received at the source device). The controller applies the volume adjustment to the audio signal (at block 43). Specifically, the controller produces a (first) volume adjusted audio signal by applying the adjustment to the obtained audio signal. The controller determines whether the volume adjusted audio signal exceeds a threshold audio level, such as 0 dBFS, as described herein (at decision block 44). For instance, the compressor or limiter 13 may determine whether (at least a portion of) a signal level of the signal exceeds the threshold. If so, the controller applies dynamic range compression on the volume adjusted audio signal (at block 45). For instance, the controller produces a compressed audio signal by applying the compression, which may be based on the volume adjustment, as described herein. The controller applies an inverse volume adjustment to the compressed audio signal (at block 46). In particular, the controller produces a (second) inverse volume adjusted audio signal by applying the inverse adjustment. If, however, the signal level is below the threshold (e.g., the audio signal not exceeding 0 dBFS), the controller applies the inverse volume adjustment (at block 46) to produce an inverse volume adjusted audio signal that is the same or similar to the obtained audio signal. The controller 10 (or more specifically the audio source device 2) transmits the inverse volume adjusted audio signal to the audio output device, e.g., via BLUETOOTH (at block 47).

Figure 5:
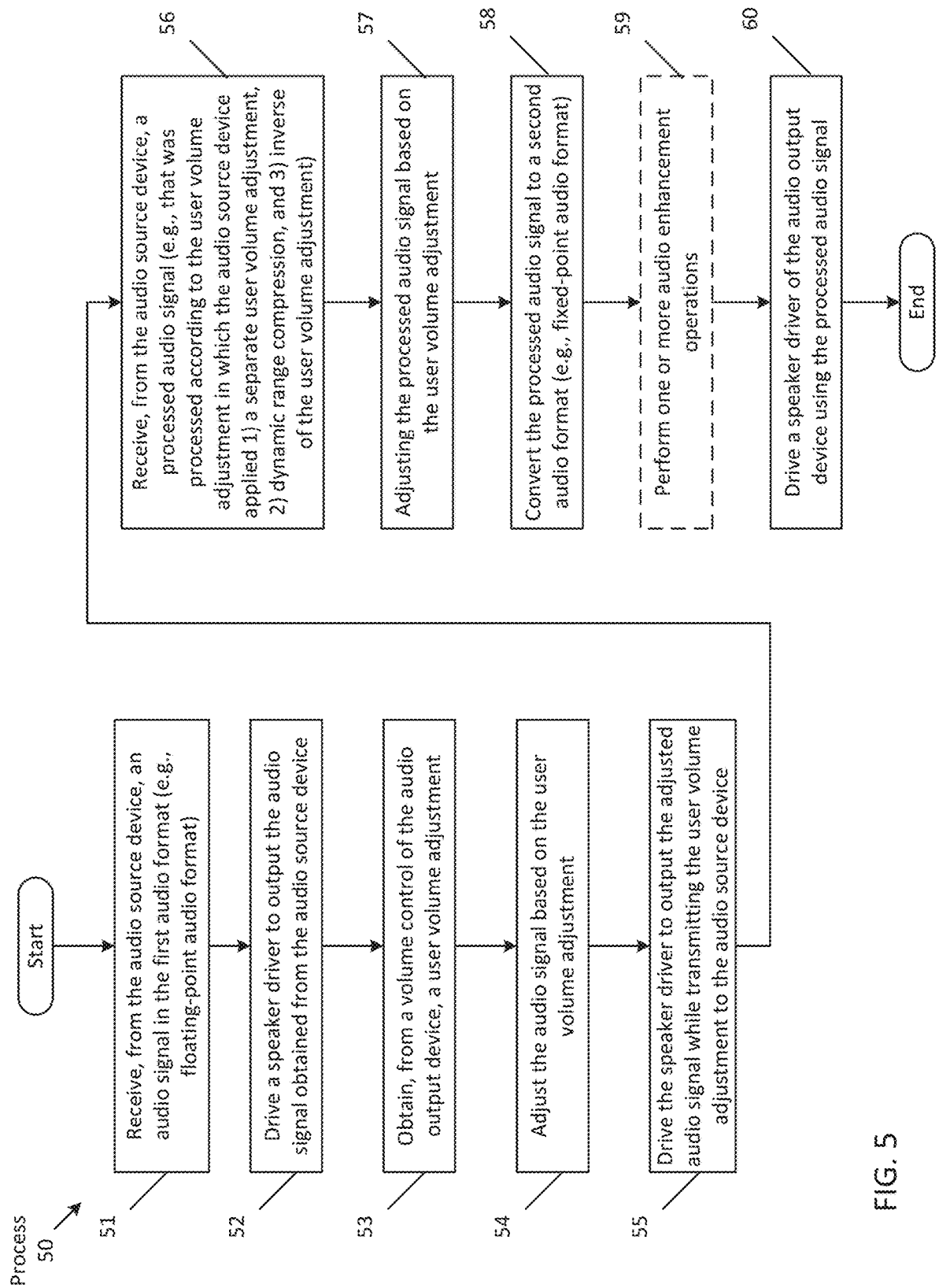
FIG. 5 is a flowchart of one aspect of a process for applying the hardware volume adjustment to processed audio according to one aspect.

FIG. 5 is a flowchart of one aspect of a process 50 for applying the hardware volume adjustment to processed audio according to one aspect. In one aspect, the process 50 is performed by controller 30 of the audio output device 3. Specifically, at least some of the operations may be performed by at least some of the operational blocks 32-35 performed by the controller 30, as described herein. In one aspect, the process 50 may be performed while the audio output device 3 is streaming audio content for playback that is being provided by the audio source device 2.

The process 50 begins by the controller 30 receives, from the audio source device, an audio signal in the first audio format, floating-point audio format (at block 51). In one aspect, the audio signal may be the audio signal produced by the spatializer 11. In other words, the audio signal may not be a processed audio signal of which the controller 10 of the audio source device applied dynamic range compression. The controller 30 drives a speaker driver to output the audio signal obtained from the audio source device (at block 52). For instance, the controller 30 may use the audio signal to drive speaker driver 31. In some aspects, the controller may perform at least some operations described herein. For example, the controller may convert the audio signal to a fixed-point audio format and perform one or more audio enhancement operations. The controller 30 obtains, from the volume control 5 of the audio output device a user volume adjustment (at block 53). In particular, the controller may obtain a control signal in response to user input, which indicates a volume adjustment associated with the user input.

The controller 30 adjusts the audio signal based on the user volume adjustment (at block 54). In particular, the volume adjustor 33 obtains the user volume adjustment 16 and applies the adjustment to the audio signal to produce a volume adjusted audio signal. The controller drives the speaker driver 31 to output the adjusted audio signal while transmitting the user volume adjustment to the audio source device (at block 55). The controller 30 receives, from the audio source device, a processed audio signal (e.g., audio signal 20), that was processed according to the user volume adjustment in which the audio source device applied 1) a separate user volume adjustment, 2) dynamic range compression, and 3) an inverse of the user volume adjustment (at block 56). In one aspect, the controller 30 may receive the processed audio signal from the audio source device in response to transmitting the user volume adjustment. In some aspects, the user volume adjustment may be immediately applied to (e.g., a portion of) the audio signal, so that the user may perceive the change without any delay. In one aspect, the portion of audio data may be samples of audio data that are stored within buffers used to store audio data that was transmitted over BLUETOOTH, as described herein. Along with immediately applying the volume adjustment, the audio output device transmits the adjustment to the audio source device such that later portions of the audio signal may be processed to ensure that the audio signal is not distorted when output by the speaker driver.

The controller 30 adjusts the processed audio signal based on the user volume adjustment (at block 57). Specifically, the volume adjustor 33 may apply the user volume adjustment to eth processed audio signal. The controller converts the (volume adjusted) processed audio signal to a second audio format, such as fixed-point audio format (at block 58). The controller performs one or more audio enhancement operations, such as ANC operations (at block 59). The controller drives at least one speaker driver of the audio output device using the (volume adjusted) processed audio signal (at block 60).

Some aspects may perform variations to the processes 40 and/or 50 described FIGS. 4 and 5. For example, the specific operations of at least some of the processes may not be performed in the exact order shown and described. The specific operations may not be performed in one continuous series of operations and different specific operations may be performed in different aspects. For example, at least some of the operations may be omitted, such as the operations with dashed borders. As described herein, the audio source device and/or the audio output device may perform at least some (or all of the operations) described in FIGS. 2 and 3. Similarly, controllers 10 and 30 of the source device 2 and the output device 3, respectively, may perform some or all of the operations described in processes 40 and 50. In this way, one device, such as the audio output device, may perform the operations to apply the dynamic range compression in response to receiving a user volume adjustment.

In one aspect, at least some of the operations of processes 40 and 50 may be performed in response to the volume control 5 of the audio output device 3 receiving user input to adjust the volume. Specifically, upon obtaining the user volume adjustment at block 53 of process 50, the controller 30 may perform at least some of the operations described in blocks 54-60, while the controller 10 may perform at least some of the operations in process 40.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by an audio source device that is communicatively coupled with an audio output device, the method comprising:
obtaining an audio signal;
receiving, from the audio output device, a volume adjustment for the audio signal;
applying the volume adjustment to the audio signal;

applying dynamic range compression on the volume adjusted audio signal; and
applying an inverse volume adjustment to the compressed audio signal,
wherein the inverse volume adjusted audio signal is to be transmitted to the audio output device that is configured to apply the volume adjustment to the inverse volume adjusted audio signal.

2. The method of claim 1 further comprising determining the dynamic range compression based on a difference between a signal level of the volume adjusted audio signal and a threshold audio level.

3. The method of claim 2, wherein the threshold audio level is 0 decibels relative to full scale (dBFS) of the audio output device, wherein a signal level of the compressed audio signal does not exceed the 0 dBFS.

4. The method of claim 1 further comprising determining whether the volume adjustment is greater than a previous volume adjustment received from the audio output device, wherein the dynamic range compression is applied to the volume adjusted audio signal responsive to the volume adjustment being greater than the previous volume adjustment.

5. The method of claim 1 further comprising:
obtaining two or more audio channels; and
performing matrix mixing operations upon the audio channels to produce the audio signal,
wherein a signal level of at least one of the two or more audio channels does not exceed 0 decibels relative to full scale (dBFS) of the audio output device, while a signal level of the audio signal exceeds the 0 dBFS.

6. The method of claim 5, wherein at least one of the audio channels is associated with a first software program that is being executed by the audio source device and at least another one of the audio channels is associated with a second software program that is being executed by the audio source device.

7. The method of claim 1, wherein the audio output device is a wireless headset that is wirelessly connected to the audio source device.

8. An electronic device comprising:
at least one processor; and
memory having instructions stored therein which when executed by the at least one processor causes the electronic device to:
obtain an audio signal;
receive, from an audio output device, a volume adjustment for the audio signal;
applying the volume adjustment to the audio signal;
applying dynamic range compression on the volume adjusted audio signal;
applying an inverse volume adjustment to the compressed audio signal; and
transmit the inverse volume adjusted audio signal to the audio output device that is configured to apply the volume adjustment to the inverse volume adjusted audio signal for playback.

9. The electronic device of claim 8, wherein the memory has further instructions to determine the dynamic range compression based on a difference between a signal level of the volume adjusted audio signal and a threshold audio level.

10. The electronic device of claim 9, wherein the threshold audio level is 0 decibels relative to full scale (dBFS) of the audio output device, wherein a signal level of the compressed audio signal does not exceed the 0 dBFS.

11. The electronic device of claim 8, wherein the memory has further instructions to determine whether the volume adjustment is greater than a previous volume adjustment received from the audio output device, wherein the dynamic range compression is applied on the volume adjusted audio signal responsive to the volume adjustment being greater than the previous volume adjustment.

12. The electronic device of claim 8, wherein the memory has further instructions to:
obtain two or more audio channels; and
perform matrix mixing operations upon the audio channels to produce the audio signal,
wherein a signal level of at least one of the two or more audio channels does not exceed 0 decibels relative to full scale (dBFS) of the audio output device, while a signal level of the audio signal does exceed the 0 dBFS.

13. The electronic device of claim 12, wherein at least one of the audio channels is associated with a first software program that is being executed by the electronic device and at least another one of the audio channels is associated with a second software program that is being executed by the electronic device.

14. The electronic device of claim 8, wherein the audio output device is a wireless headset that is wirelessly connected to the electronic device.

15. A processor of an electronic device that is configured to:
obtain an audio signal;
receive, from an audio output device, a volume adjustment for the audio signal;
applying the volume adjustment to the audio signal;
applying dynamic range compression on the volume adjusted audio signal;
applying an inverse volume adjustment to the compressed audio signal; and
transmit the inverse volume adjusted audio signal to the audio output device that is configured to apply the volume adjustment to the inverse volume adjusted audio signal.

16. The processor of claim 15 is further configured to determine the dynamic range compression based on a difference between a signal level of the volume adjusted audio signal and a threshold audio level.

17. The processor of claim 16, wherein the threshold audio level is 0 decibels relative to full scale (dBFS) of the audio output device.

18. The processor of claim 17, wherein a signal level of the compressed audio signal does not exceed the 0 dBFS.

19. The processor of claim 15 is further configured to:
obtain two or more audio channels; and
perform matrix mixing operations upon the audio channels to produce the audio signal,
wherein a signal level of at least one of the two or more audio channels does not exceed 0 decibels relative to full scale (dBFS) of the audio output device, while a signal level of the audio signal does exceed the 0 dBFS.

20. The processor of claim 15, wherein the audio output device is a wireless headset that is wirelessly connected to the electronic device.

* * * * *